No. 630,350. Patented Aug. 8, 1899.
J. H. HEWITT & J. F. EDDS.
NAILLESS HORSESHOE.
(Application filed May 19, 1899.)
(No Model.)

Witnesses
Inventors
John H. Hewitt and
J. F. Edds,
by H. B. Willson & Co.
Attorneys

UNITED STATES PATENT OFFICE.

JOHN HENRY HEWITT AND JOHN FRANKLIN EDDS, OF HEIDENHEIMER, TEXAS.

NAILLESS HORSESHOE.

SPECIFICATION forming part of Letters Patent No. 630,350, dated August 8, 1899.

Application filed May 19, 1899. Serial No. 717,390. (No model.)

*To all whom it may concern:*

Be it known that we, JOHN HENRY HEWITT and JOHN FRANKLIN EDDS, citizens of the United States, residing at Heidenheimer, in the county of Bell and State of Texas, have invented certain new and useful Improvements in Horseshoes; and we do declare the following to be a full, clear, and exact description of the invention, such as will enable others skilled in the art to which it appertains to make and use the same.

The invention has relation to horseshoes.

The object of the invention is to provide a shoe which may be easily and quickly attached to and removed from the hoof of an animal without the employment of nails, thus preventing the hoof being broken and otherwise damaged by the driving of nails.

With this object in view the invention consists in certain features of construction and combination of parts, which will be hereinafter fully described and claimed.

Figure 1:
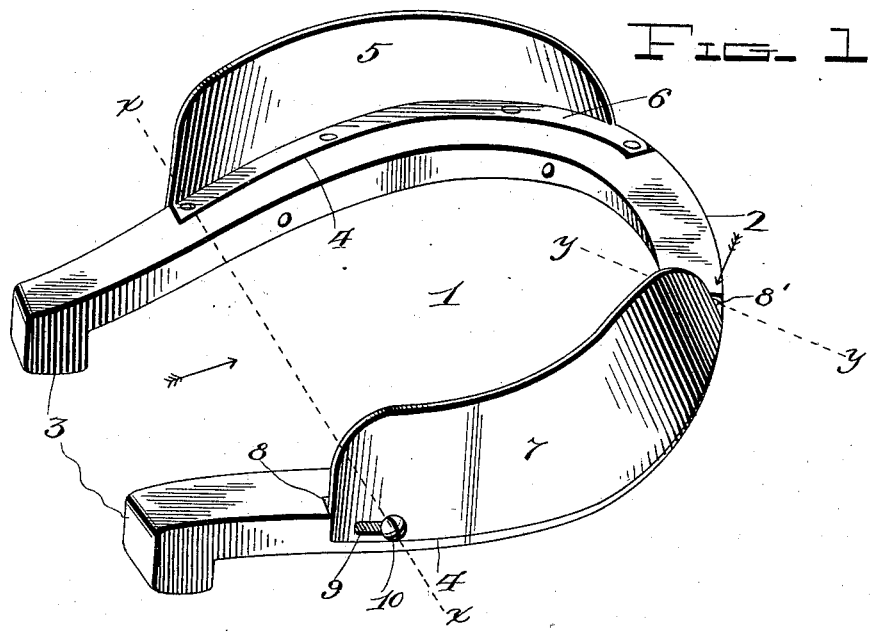
Figure 2:
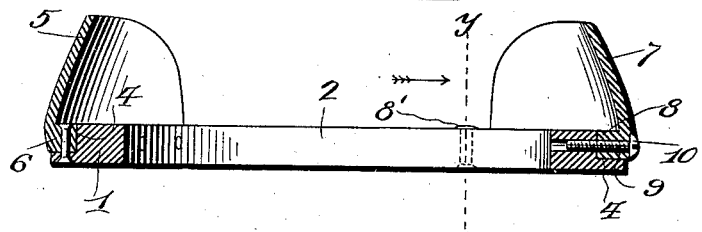
Figure 3:
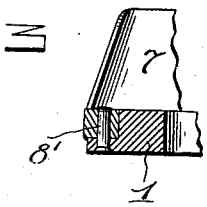

In the accompanying drawings, Figure 1 is a perspective view of our improved horseshoe. Fig. 2 is a cross-sectional view on line *x x*, Fig. 1; and Fig. 3 is a sectional view on line *y y*, Fig. 2.

In the drawings, 1 denotes the shoe, which may be of any well-known or approved construction. The outer edges of this shoe, at the rear of the toe 2 and in advance of the heel 3, are provided with longitudinal recesses 4.

5 denotes a clamping-plate, which is provided with an angular base 6, firmly riveted in one of the recesses.

7 denotes an opposing clamping-plate, which is provided with an angular base 8, adapted to fit the other recess. The forward end of this angular base 8 is pivoted in a recess near the toe of the shoe by a pivot 8', while the rear end is provided with an elongated transverse aperture 9, through which a set-screw 10 extends and engages a screw-threaded aperture in the side of the shoe.

In applying the shoe the pivoted clamping-plate is swung outwardly and the shoe adjusted to the hoof of the animal, and by drawing the pivoted clamping-pin inwardly the hoof will be firmly and securely clamped between the two plates, thus rendering it unnecessary to drive nails in the hoof and at the same time permitting of the ready removal of the shoe.

From the foregoing description, taken in connection with the accompanying drawings, the construction, operation, and advantages of the device will be readily apparent without requiring an extended explanation.

The device is exceedingly simple, may be made at small cost, and is well adapted for the purpose for which it is designed.

It will of course be understood that changes in the form, proportion, and the minor details of construction may be resorted to without departing from the principles or sacrificing any of the advantages of this invention.

Having thus described the invention, what is claimed, and desired to be secured by Letters Patent, is—

A horseshoe having in its outer sides at the rear of the toe 2, longitudial recesses that extend adjacent to the heel of the shoe; in combination with two clamping-plates each of which is provided with an angular base, the base of one plate being fixed in one of said recesses, and the base of the other plate being pivoted in the other recess, and a set-screw extending transversely through the opposite end of the pivoted base and into the shoe, substantially as and for the purpose set forth.

In testimony whereof we have hereunto set our hands in presence of two subscribing witnesses.

JOHN HENRY HEWITT.
JOHN FRANKLIN EDDS.

Witnesses:
RILEY O. MARSHALL,
J. D. HILL.